United States Patent [19]

Fluegel

[11] Patent Number: 5,423,498
[45] Date of Patent: Jun. 13, 1995

[54] MODULAR LIQUID SKIN HEAT EXCHANGER

[75] Inventor: Kyle G. Fluegel, Greenville, Tex.

[73] Assignee: E-Systems, Inc., Dallas, Tex.

[21] Appl. No.: 52,704

[22] Filed: Apr. 27, 1993

[51] Int. Cl.$^6$ .......................... B64C 1/00; B64D 47/00
[52] U.S. Cl. ...................................... 244/117 A; 165/41
[58] Field of Search .................... 244/117 A, 163, 57; 165/41, 76; 62/239, 241

[56] References Cited

U.S. PATENT DOCUMENTS

| | | | |
|---|---|---|---|
| 2,646,971 | 7/1953 | Raskin | 165/134.1 |
| 2,856,163 | 10/1958 | Bidak et al. | 165/171 |
| 3,776,305 | 12/1973 | Simmons | 165/104.25 |
| 4,057,104 | 11/1977 | Altoz | 165/32 |
| 4,273,183 | 6/1981 | Altoz et al. | 165/32 |
| 4,557,319 | 12/1985 | Arnold | 165/44 |
| 4,763,727 | 8/1988 | Kreuzer et al. | 165/171 |
| 4,786,015 | 11/1988 | Niggemann | 244/117 A |
| 4,819,720 | 4/1989 | Howard | 165/104.34 |
| 4,871,012 | 10/1989 | Kuo | 244/163 |
| 4,969,509 | 11/1990 | Merensky | 165/41 |
| 5,131,458 | 7/1992 | Bourne et al. | 165/76 |
| 5,158,133 | 10/1992 | Duong | 165/76 |

FOREIGN PATENT DOCUMENTS 325096 2/1991 Japan .................. 244/117 A

Primary Examiner—William Grant
Attorney, Agent, or Firm—Harold E. Meier

[57] ABSTRACT

A liquid coolant heat exchange system for use in semimonocoque aircraft includes an arcuate planar heat sink fixed along a radius of curvature R, by forming members, a flexible arcuate planar spreader plate having a radius $R_2$, such that $R_1 > R_2$, a heat exchange tube for transferring heat from the liquid coolant to the heat sink and means for attaching the spreader plate to the forming members to hold the spreader plate in contact with the heat sink.

13 Claims, 4 Drawing Sheets

MODULAR LIQUID SKIN HEAT EXCHANGER

BACKGROUND OF THE INVENTION

"Semimonocoque" as used herein refers to aircraft having a fuselage of the type constructed, at least in part, by attaching a veneer around forming members, such as longitudinal stringers and circumferential belt frame members, to produce a structure in which the veneer carries at least a portion of the stresses arising in the fuselage. Many modern aircraft employ a semimonocoque design, including aircraft that are equipped with on board electronic systems and aircraft that are retrofitted with new electronic systems as such systems become available.

The present invention relates to heat transfer systems that provide cooling and heat dissipation functions in semimonocoque aircraft. In one application, the present invention is used to cool electronic systems on such aircraft. Many modern electronic systems used in aircraft generate sufficient heat to destroy or interfere with the function of individual electronic components such as resistors, capacitors, transistors and integrated circuits. Consequently, heat generated by these electronic systems must be dissipated at a sufficient rate to maintain the system temperature at or below a predetermined upper operating limit, typically about 55° C. (131° F.) for many electronic systems. Additionally, new electronic systems must be tested prior to deployment, requiring the systems to be temporarily installed on existing aircraft. The heat load generated during testing of temporarily installed electronic systems often requires additional cooling capacity, above and beyond the design capacity of the original equipment.

Conventional air conditioning equipment is one means of cooling aircraft electronic systems. Conventional air conditioning equipment is, however, heavy, expensive, and maintenance intensive. Additionally, conventional air conditioning systems require substantial power which, in the case of an aircraft, must be obtained from the aircraft's engine(s) thereby reducing the aircraft's performance and increasing its fuel consumption. Heat transfer to the ambient atmosphere is a more efficient and considerably less expensive cooling method than conventional refrigeration methods for on board electronic systems. As a result, a number of different types of heat exchanger systems which transfer heat through an aircraft's fuselage skin have been developed.

One such alternative system uses air as a heat transfer medium and the aircraft's fuselage skin as a heat sink. Pressurized air is circulated past the aircraft's fuselage skin to dissipate heat and then recirculated to cool on board electronic system components. Such systems are known as air to air skin heat exchange systems. Air to air skin heat exchange systems, however, have several drawbacks.

Air has a low specific heat per unit volume, consequently, large temperature changes are required in air to air heat exchange systems to maintain low air flow rates. The temperature of the air entering the skin heat exchanger typically approaches the upper operating limit of the on board electronics, for example about 55° C. (131° F.). Preferably, the temperature of the air leaving the skin heat exchanger is as low as possible to maintain the air flow rates of the system as low as possible. Lowering the temperature of the air leaving the air to air skin heat exchanger has the inevitable consequence of decreasing the temperature differential across the fuselage skin, thus limiting the operational envelope of the system to high altitudes where frigid ambient temperatures exist. The volume of air recirculated in air to air skin heat exchange systems coupled with the low specific heat per volume of air also requires large flow passages in order to maintain a workable pressure drop through the system. These large flow passages are difficult to design and install around cramped electronics platforms where space is at a premium and also result in relatively heavy cooling systems. Adaptation of air to air skin heat exchange systems to existing aircraft thus requires extensive aircraft modifications which result in high cost and lengthy manufacturing schedules.

Moreover, the inside heat transfer film coefficient, which is usually on the order of 5 to 10 BTU/hr ft$^2$ °R, dictates the fuselage skin area required for air to air skin heat exchange since the exterior film coefficient is much higher, on the order of 20 to 60 BTU/hr ft$^2$ °R. Thus, air to air skin heat exchange systems are incapable of taking advantage of the available heat transfer capacity per square foot of fuselage skin area.

Other alternative systems include liquid cooling systems. The use of liquids to transfer and dissipate heat is highly utilized because fluids typically have a very high heat capacity per unit volume compared to gasses such as air. Liquid cooling systems used in aircraft typically dissipate heat collected in a liquid coolant to the fuel located in the wing tanks with coolant to fuel heat exchangers. The fuel in turn dissipates heat to the frigid atmosphere that exists at the high operational altitudes where many modern aircraft operate.

One major disadvantage of existing aircraft liquid cooling systems, which dissipate heat to the aircraft's fuel, is that such systems require extensive aircraft modification. Consequently, such systems are expensive to design and install, especially in the case where the system is retrofitted to an existing aircraft. Compounding this problem is the fact that the installation cost of existing aircraft liquid coolant systems is not proportional to the installed cooling capacity. Thus, the installation cost of a 60 kW system of the existing type could cost nearly as much as a 120 kW system. Additionally, retrofitting a liquid coolant system into an existing aircraft is time consuming, thereby reducing aircraft availability.

U.S. Pat. No. 4,819,720, issued to Howard, discloses a heat exchanger used to cool avionic equipment whereby a liner is used to create a gap with the aircraft's skin forming a heat transfer envelope through which air may be circulated.

U.S. Pat. No. 2,646,971, issued to Raskin, discloses a method for attaching a fluid transferring tube to a metal plate for transfer.

U.S. Pat. No. 4,763,727, issued to Kreuzer, et al., discloses an assembly which connects a heat conducting plate to a pipe for heat transfer.

U.S. Pat. No. 4,969,409, issued to Merensky, discloses a system for cooling food and beverages on aircraft consisting of a cold air chamber next to the skin of the aircraft.

U.S. Pat. No. 3,776,305, issued to Simmons, discloses a heat transfer system in which air flowing over a network of plates is used to cool a liquid flowing through the plates.

U.S. Pat. No. 4,057,104, issued to Altoz, discloses an electronic component pod which is mounted on the exterior of the aircraft. Components in the pod are cooled by the flow of air over the exterior surface of the pod.

U.S. Pat. No. 4,273,183, issued to Altoz, et al., discloses a unidirectional heat transfer assembly for use between an electronic assembly on an aircraft and the skin and/or pod on the aircraft. The device includes a thermal decoupler mechanism which operates to disengage a retractable interface heat transfer surface when the aircraft skin rises to a predetermined temperature.

U.S. Pat. No. 4,786,015, issued to Niggemann, discloses heat exchanger tubes that are noncircular in construction and act as a load-bearing structure for the leading edges of an air foil or the nose cone of an aircraft.

U.S. Pat. No. 4,557,319, issued to Arnold, discloses a system of heat exchanger tubes which are noncircular and are used to cool the keels of marine vessels.

U.S. Pat. No. 2,856,163, issued to Bidak, et al., discloses an arrangement for maintaining a tubing assembly in heat transfer contact with a wall.

The foregoing references, the disclosures of which are incorporated in their entireties for all purposes, do not however provide the novel modular heat exchange system of the present invention.

SUMMARY OF THE INVENTION

The present invention provides a modular liquid coolant heat exchange system for use in semimonocoque aircraft. The heat exchange system includes individual modules each comprising an arcuate planar heat sink fixed along a radius of curvature R, by forming members, a flexible arcuate planar spreader plate having a radius $R_2$, such that $R_1 > R_2$, a heat exchange tube for transferring heat from the liquid coolant to the heat sink through the spreader plate and means for attaching the spreader plate to the forming members to hold the spreader plate in contact with the heat sink. The heat exchange system of the present invention provides numerous advantages over existing systems including rapid and inexpensive installation, proportionality of cost to capacity, flexibility and efficiency.

DETAILED DESCRIPTION

Figure 1:
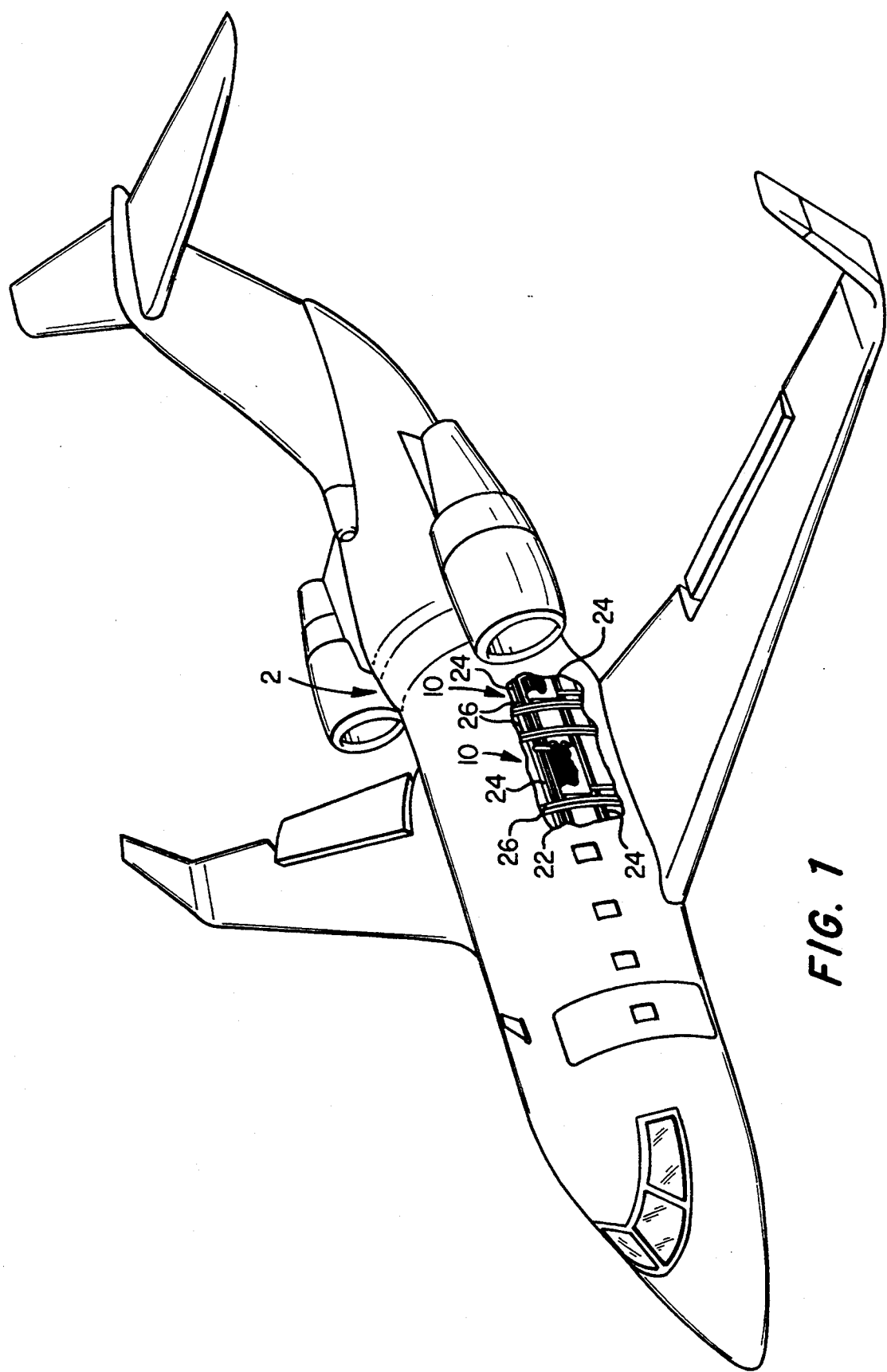
FIG. 1 is a partial cut away view of a semimonocoque aircraft employing the heat exchange modules of the present invention.

Referring now to FIG. 1, a semimonocoque aircraft 2 employing heat exchange modules 10 of the present invention is illustrated. Modules 10 are mounted between stringers 24 and beltframe members 26 which comprise the forming members to which the exterior fuselage skin 22 is attached.

Figure 2:
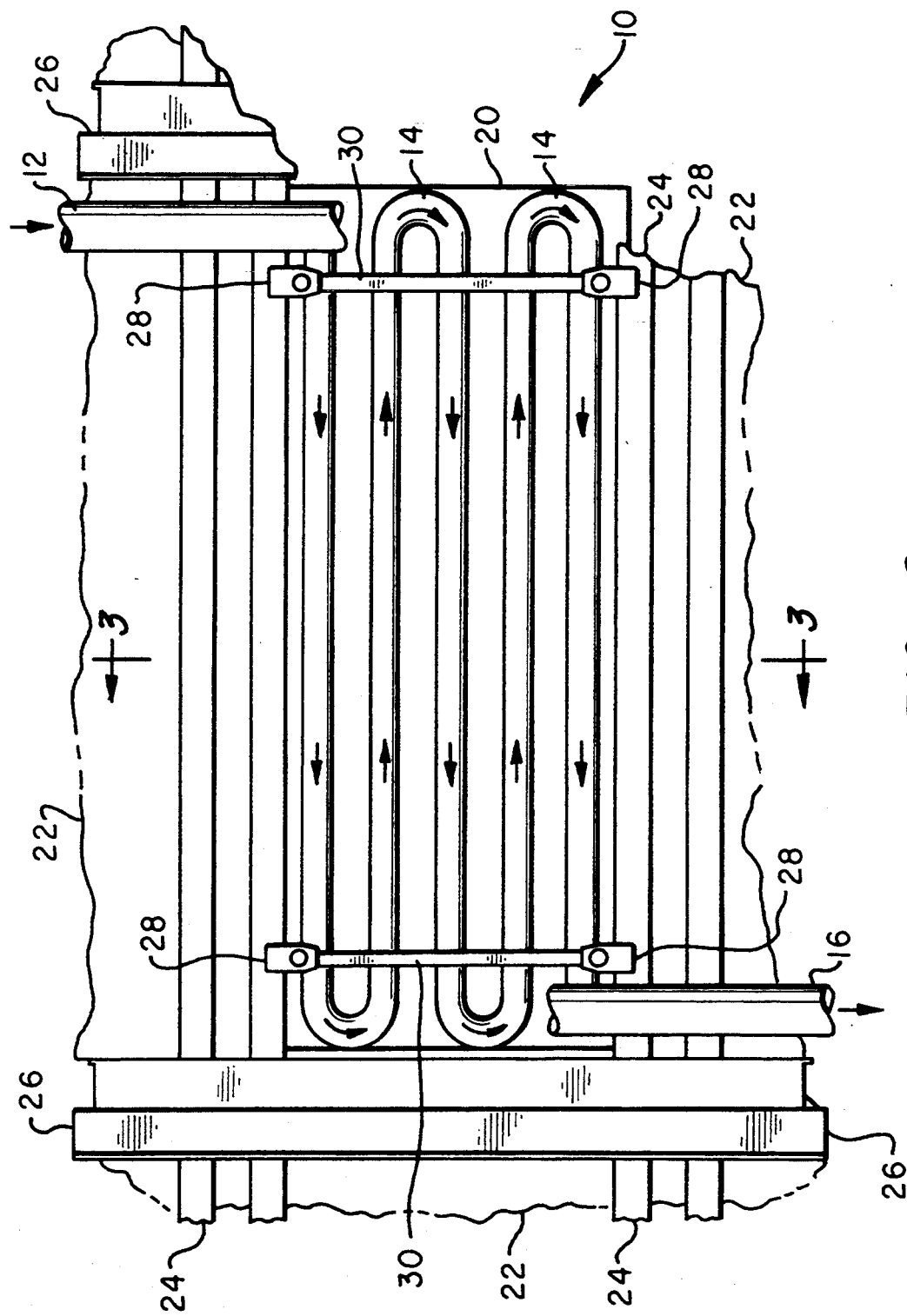
FIG. 2 is a side view of a heat exchange module of the present invention.
Figure 3:
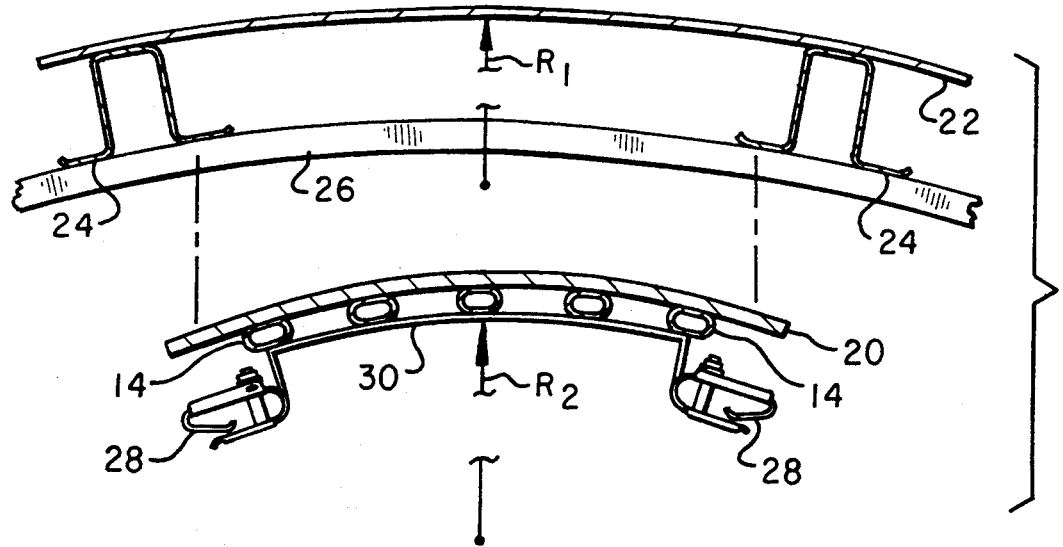
FIG. 3 is a cross section of a heat exchange module of the present invention prior to installation.

Referring now to FIGS. 2 and 3, liquid heated coolant enters heat exchange module 10 through an inlet manifold 12, passes through heat exchange tube 14, and exits the module through outlet manifold 16. The heat exchange tube 14 is typically fabricated from aluminum, copper, steel, brass or alloys thereof and may be cylindrical in cross section or may have flattened sides due to heat transfer considerations. Typically, heat exchange tube 14 will be arranged in a number of tube passes as determined by the desired level of heat transfer, available space and other considerations. The tube passes may be parallel in which case each tube pass turns 180° or alternatively the tube passes may turn less than 180° to provide a continuously downsloping path to aid in draining the heat exchange tube and to facilitate thermosyphon action.

Heat from the coolant is transferred through heat exchange tube 14 to spreader plate 20, having an arcuate or curved planar geometry, which is preferably formed from a resilient material having high thermal conductivity such as copper, aluminum or a composite material formed from pitch based carbon fibers such as those available from Amoco Performance Products, Ridgefield, Conn. under the trade designation P120 and P130. The pitch based carbon fiber composite material is preferred in many applications where weight is an important consideration. Since the spreader plate 20 is formed from a material having a high thermal conductivity, the heat load absorbed from heat exchange tube 14 is spread over areas of the spreader plate between passes of the heat exchange tube 14. Depending on the particular application and the materials used to fabricate the heat exchange tube 14 and spreader plate 20, the tube is fastened to the spreader plate through the use of conventional methods such as brazing, welding, clamping or with a contact or thermal cement. The spreader plate 20 is mounted against fuselage skin 22, which forms an arcuate or curved planar heat sink, permitting heat from the spreader plate 20 to be transferred to the aircraft's fuselage skin 22 where it is dissipated to the ambient environment. Thus, the fuselage skin serves as a heat sink for the heat exchange system.

As illustrated, the heat exchange module 10 is mounted between stringers 24 and beltframe members 26. Stringers 24 and beltframe members 26 comprise the forming members to which the exterior fuselage skin 22 of a typical semimonocoque aircraft is attached. The heat exchange module 10 is mounted between stringers 24 with brackets comprising spring type stringer clamps 28 and tube braces 30. Alternatively, stringer clamps 28 and tube braces 30 could be combined into a one piece mounting bracket. Notably, in the embodiment of the invention illustrated in FIGS. 2 and 3, the use of spring type stringer clamps 28 and tube braces 30 to mount the heat exchange module 10 does not require drilling, cutting or welding of the stringers or fuselage thereby facilitating installation and avoiding the creation of stress points.

Referring now only to FIG. 3, the portion of the aircraft's fuselage skin 22 to which heat exchange module 10 is attached defines an arc having a radius of curvature $R_1$. Alternatively, spreader plate 20 and heat exchange tube 14 are formed along an arc having a radius of curvature $R_2$ such that $R_1 > R_2$.

Figure 4:
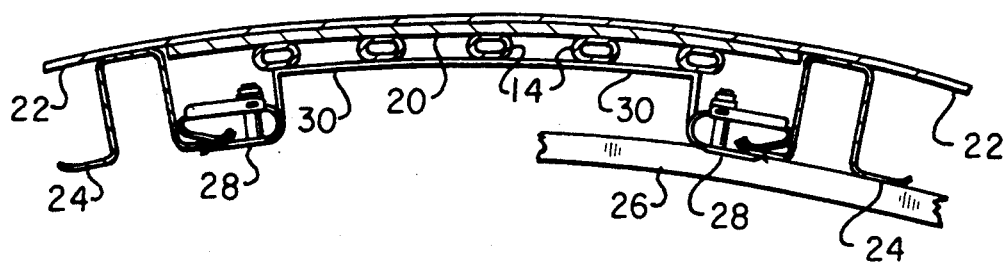
FIG. 4 is a cross section of a heat exchange module of the present invention as installed.

As best illustrated in FIG. 4, when the heat exchange module 10 is clamped to the aircraft fuselage with stringer clamps 28 and tube braces 30, the spreader plate 20 and heat exchange tube 14 are pushed against the fuselage skin 22 along the arc defined by the fuselage skin creating a reactionary spring like force that thrusts the heat exchange module 10 against the fuselage skin 22 across the area of the spreader plate 20 to facilitate heat transfer from the spreader plate 20 to the fuselage skin. Additionally, in some applications, it may also be desirable to coat the surface of spreader plate 20 and/or the fuselage skin 22 with a contact or thermal cement prior to installation to reduce contact resistance.

In order to facilitate a uniform distribution of the heat load, the thickness of the spreader plate 20 may vary with the thermal conductivity of the fuselage skin 22, operating temperature, tube spacing and other design parameters. Liquid coolants suitable for use in connection with the present invention include water, ethylene glycol/water, Coolanols, Poly Alpha Olanol or cooling slurries (microencapsulated phase change materials in coolant fluids). Liquid coolant is circulated through the heat exchange module 10 with a pump, or alteratively, thermosyphon action may be used to circulate the coolant.

Figure 5:
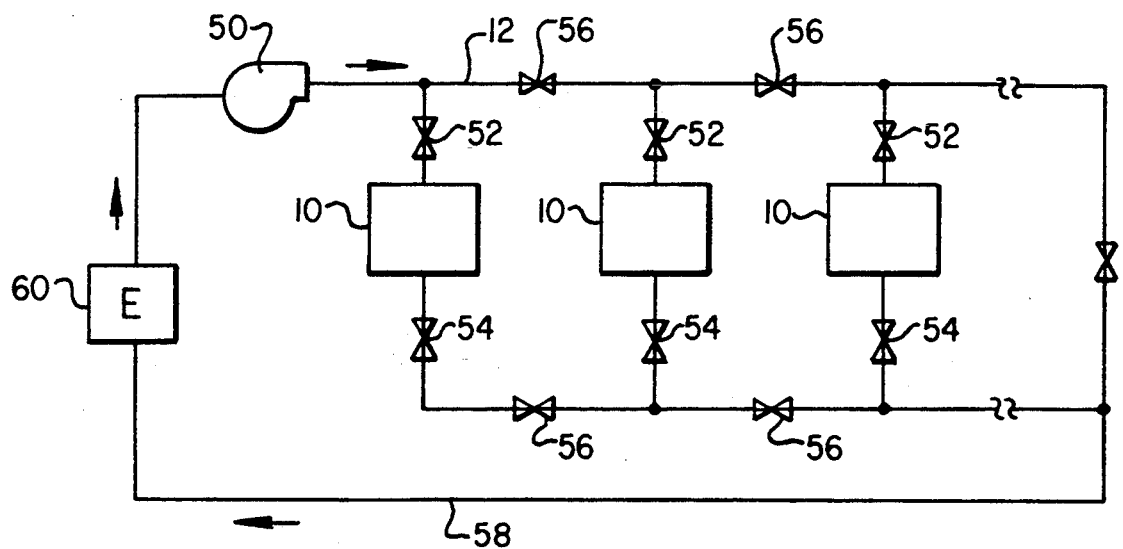
FIG. 5 is a schematic illustration of a heat exchange system employing multiple heat exchange modules.

Referring now to FIG. 5, a heat exchange system utilizing multiple heat exchange modules 10 is schematically illustrated. Pump 50 circulates heated liquid coolant through inlet manifold 12 to individual heat exchange modules 10. Inlet and outlet valves 52 and 54 allow individual modules to be isolated from the system while bypass valves 56 allow for the modules to be connected in series or in parallel as desired. Liquid coolant exiting the modules is recirculated via return line 58 to cool electronics module 60. Other piping and valving arrangements may be used to interconnect individual modules depending upon the particular application and design requirements.

Thus, the heat exchange system of the present invention, because of its modular design, enables rapid and inexpensive installation of moderately sized liquid cooling systems for liquid cooled on board aircraft electronics. The modular design of the heat exchange system of the present invention also permits installation of an aircraft liquid cooling system consisting of multiple identical modules resulting in economies of high manufacturing quantities and commonality of parts.

Moreover, the modularity of the invention results in proportionality between the cooling capacity of a liquid cooling system and the installation cost of the system permitting earlier and experimental introduction of liquid cooled electronics and new liquid cooling fluids such as microencapsulated phase change materials. Additionally, the heat exchange system of the present invention is installed with little or no structural modification permitting rapid and easy removal of the system subsequent to trial deployment of liquid cooled electronics. The modular design of the system also permits incremental upgrading of the system as the cooling demands increase. In the case of a failure, a single module can be isolated allowing the remainder of the system to operate. The failed module can then be scheduled for replacement at a convenient time whereas failure of existing systems may dictate that the aircraft be taken out of service immediately for extensive repairs.

While the present invention has been described in connection with the illustrated embodiments, it is not intended to limit the invention to the particular forms set forth, but on the contrary, it is intended to cover such alternatives, modifications, and equivalents as may be included in the spirit and scope of the invention as defined in the following claims.

I claim:

1. A liquid coolant heat exchange system comprising:
   an arcuate planar heat sink having an inner surface;
   forming members for supporting said arcuate planar heat sink along a radius of curvature $R_1$;
   a flexible arcuate planar spreader plate having an outer surface and a radius $R_2$, such that $R_1 > R_2$;
   a heat exchange tube attached to said flexible arcuate planar spreader plate in a substantially abutting relationship;
   means for attaching said arcuate planar spreader plate to said forming members, and for positioning the outer surface of said arcuate planar spreader plate in substantially abutting relationship with the inner surface of said arcuate planar heat sink for transferring heat from said heat exchange tube to said arcuate planar heat sink.

2. The heat exchange system of claim 1 wherein said arcuate planar heat sink comprises a fuselage skin of an aircraft.

3. The heat exchange system of claim 1 wherein said arcuate planar spreader plate comprises a carbon fiber composite material.

4. A heat exchange system comprising:
   an arcuate planar heat sink having an inner surface with a radius of curvature $R_1$; and
   a plurality of interconnected heat exchange modules mounted to the arcuate planar heat sink, each module comprising:
      a flexible arcuate planar spreader plate having an outer surface with a radius of curvature of $R_2$, wherein $R_1 > R_2$;
      a heat exchange tube positioned in substantially abutting relationship with said flexible arcuate planar spreader plate; and
      means for mounting said arcuate planar spreader plate to said arcuate planar heat sink to position the outer surface of said arcuate planar spreader plate in substantially abutting relationship with the inner surface of said arcuate planar heat sink for transferring heat from said heat exchange tube to said arcuate planar heat sink.

5. The heat exchange system of claim 4 including means for connecting said modules in series to form a cooling circuit.

6. The heat exchange system of claim 4 wherein said modules are connected in parallel to form a cooling circuit.

7. The heat exchange system of claim 4 wherein each said arcuate planar spreader plate comprises a carbon fiber composite material.

8. An aircraft including a heat exchange system comprising:
   an arcuate planar heat sink;
   forming members for supporting said arcuate planar heat sink along a radius of curvature $R_1$; and
   at least one heat exchange module, comprising:
      a flexible arcuate planar spreader plate having a radius $R_2$, such that $R_1 > R_2$;
      a heat exchange tube attached to said flexible arcuate planar spreader plate in a substantially abutting relationship; and
      means for mounting said arcuate planar spreader plate to said forming members and for positioning said arcuate planar spreader plate into surface contact with said arcuate planar heat sink for transferring heat from said heat exchange tube to said arcuate planar heat sink.

9. The aircraft of claim 8 wherein said arcuate planar heat sink comprises the fuselage skin of the aircraft.

10. The aircraft of 8 wherein said arcuate planar spreader plate comprises a carbon filter composite material.

11. The aircraft of claim 8 further comprising a plurality of heat exchange modules.

12. The aircraft of claim 11 including means for connecting said modules in series to form a cooling circuit.

13. The aircraft of claim 11 wherein said modules are connected in parallel to form a cooling circuit.

* * * * *

UNITED STATES PATENT AND TRADEMARK OFFICE
CERTIFICATE OF CORRECTION

PATENT NO.   :   5,423,498
DATED        :   June 13, 1995
INVENTOR(S)  :   Kyle G. Fluegel It is certified that error appears in the above-indentified patent and that said Letters Patent is hereby corrected as shown below:

Column 1, line 1, insert the following:

--TECHNICAL FIELD

The present invention relates to a novel modular heat exchange system suitable for use in semimonocoque aircraft, and more particularly for cooling on board electronics in such aircraft.--

Signed and Sealed this

Second Day of January, 1996

Attest:

BRUCE LEHMAN

*Attesting Officer*   *Commissioner of Patents and Trademarks*